US009383381B2

(12) United States Patent
Luo

(10) Patent No.: US 9,383,381 B2
(45) Date of Patent: Jul. 5, 2016

(54) AIRSPEED CALCULATION SYSTEM FOR AN AIRCRAFT

(71) Applicant: The Boeing Company, Chicago, IL (US)

(72) Inventor: Jia Luo, Belllevue, WA (US)

(73) Assignee: THE BOEING COMPANY, Chicago, IL (US)

( * ) Notice: Subject to any disclaimer, the term of this patent is extended or adjusted under 35 U.S.C. 154(b) by 68 days.

(21) Appl. No.: 14/209,661

(22) Filed: Mar. 13, 2014

(65) Prior Publication Data

US 2015/0260749 A1    Sep. 17, 2015

(51) Int. Cl.
*G01P 3/62* (2006.01)
*G01C 21/20* (2006.01)
*G01P 5/14* (2006.01)
*G01P 5/00* (2006.01)
*G01P 5/16* (2006.01)
*G01P 21/02* (2006.01)
*G01P 5/10* (2006.01)

(52) U.S. Cl.
CPC . *G01P 5/14* (2013.01); *G01C 21/20* (2013.01); *G01P 5/00* (2013.01); *G01P 5/10* (2013.01); *G01P 5/16* (2013.01); *G01P 21/025* (2013.01)

(58) Field of Classification Search
CPC ............. G01C 21/20; G01P 3/62; G01P 5/10; G01P 5/14
USPC ..................................... 701/14, 6, 7; 340/969
See application file for complete search history.

(56) References Cited

U.S. PATENT DOCUMENTS

| 5,349,347 | A * | 9/1994 | Muller .......................... 340/969 |
| 5,797,105 | A * | 8/1998 | Nakaya et al. ..................... 701/7 |
| 6,564,628 | B1 * | 5/2003 | Leblond et al. ............. 73/178 R |
| 6,757,624 | B1 * | 6/2004 | Hwang et al. ................... 702/50 |
| 7,389,164 | B1 | 6/2008 | Conner et al. |
| 2005/0159857 | A1 * | 7/2005 | Parlini .............................. 701/4 |

(Continued)

FOREIGN PATENT DOCUMENTS

| EP | 1391736 A1 | 2/2004 |
| EP | 2434296 A2 | 3/2012 |
| FR | 2988835 A1 | 10/2013 |

OTHER PUBLICATIONS

European Patent Office, European Search Report & Written Opinion, Application No. 14198277.7-1558, dated Apr. 28, 2015.
Yeh, Y.C. (Bob), Triple-Triple Redundant 777 Primary Flight Computer, Aerospace Applications Conference, 1996, vol. 1, pp. 293-307, IEEE, Piscataway, United States.

(Continued)

*Primary Examiner* — Tan Q Nguyen

(57) ABSTRACT

An airspeed calculation system for determining the airspeed of an aircraft includes a static pressure device, a global positioning system device, an inertial measurement unit device, an angle of attack device, a total pressure sensor, a total air temperature sensor, at least one processor, and a memory. The at least one processor is in electronic communication with the memory, the static pressure device, the global positioning system device, the inertial measurement unit device, the angle of attack device, the total pressure sensor, and the total air temperature sensor. The memory includes programming code for execution by the at least one processor. The programming code is configured to determine the airspeed of the aircraft using data obtained from each of the static pressure device, the global positioning system device, the inertial measurement unit device, the angle of attack device, the total pressure sensor, and the total air temperature sensor.

21 Claims, 6 Drawing Sheets

(56) References Cited

U.S. PATENT DOCUMENTS

2009/0222150 A1 9/2009 Preaux
2010/0100260 A1* 4/2010 McIntyre et al. ............... 701/6
2010/0185343 A1 7/2010 Broquet et al.
2011/0238373 A1 9/2011 Foster et al.
2011/0264308 A1 10/2011 Perrie et al.

OTHER PUBLICATIONS

European Patent Office, European Search Report, Application No. 11179827.8, dated Jun. 28, 2012, published Aug. 8, 2012.

* cited by examiner

AIRSPEED CALCULATION SYSTEM FOR AN AIRCRAFT

FIELD OF THE DISCLOSURE

This disclosure relates to an airspeed calculation system for determining the airspeed of an aircraft.

BACKGROUND

Current systems and methods for determining the airspeed of an aircraft typically use trailing cones to calibrate static pressure and airspeed. This is expensive and can experience reliability and accuracy issues.

A system and method is needed to decrease or resolve one or more issues of one or more of the current systems or methods for determining the airspeed of an aircraft.

SUMMARY

In one embodiment, an airspeed calculation system is disclosed for determining the airspeed of an aircraft. The airspeed calculation system includes a static pressure device, a global positioning system device (GPS), an inertial measurement unit device (IMU), an angle of attack device, a total pressure sensor, a total air temperature sensor, at least one processor, and a memory. The static pressure device is configured to determine a static pressure acting on the aircraft. The global positioning system device is configured to determine an inertial position such as geometric altitude of the aircraft referenced to the 1984 World Geodetic System (WGS84). The inertial measurement unit device is configured to determine inertial measurements such as load factors, body angular rates and Euler angles of the aircraft. The angle of attack device is configured to determine an angle of attack of the aircraft. The total pressure sensor is configured to determine a total pressure that the aircraft experiences while the aircraft is moving. The total air temperature sensor is configured to determine a total air temperature that the aircraft experiences while the aircraft is moving. The at least one processor is in electronic communication with the static pressure device, the global positioning system device, the inertial measurement unit device, the angle of attack device, the total pressure sensor, and the total air temperature sensor. The memory is in electronic communication with the at least one processor. The memory includes programming code for execution by the at least one processor. The programming code is configured to determine an airspeed of the aircraft using data obtained from each of the static pressure device, the global positioning system device, the inertial measurement unit device, the angle of attack device, the total pressure sensor, and the total air temperature sensor.

In another embodiment, a method for determining an airspeed of an aircraft is disclosed. A processor determines the airspeed of the aircraft based on each of a static pressure acting on the aircraft, an inertial position of the aircraft, an inertial measurement of the aircraft, an angle of attack of the aircraft, a total pressure that the aircraft experiences while the aircraft is moving, and a total air temperature that the aircraft experiences while the aircraft is moving.

In still another embodiment, a non-transitory computer readable medium is disclosed. The non-transitory computer readable medium includes instructions to command a processor to determine an airspeed of an aircraft based on each of a static pressure acting on the aircraft, an inertial position of the aircraft, an inertial measurement of the aircraft, an angle of attack of the aircraft, a total pressure that the aircraft experiences while the aircraft is moving, and a total air temperature that the aircraft experiences while the aircraft is moving.

The scope of the present disclosure is defined solely by the appended claims and is not affected by the statements within this summary.

BRIEF DESCRIPTION OF THE DRAWINGS

The disclosure can be better understood with reference to the following drawings and description. The components in the figures are not necessarily to scale, emphasis instead being placed upon illustrating the principles of the disclosure.

DETAILED DESCRIPTION

Figure 1:
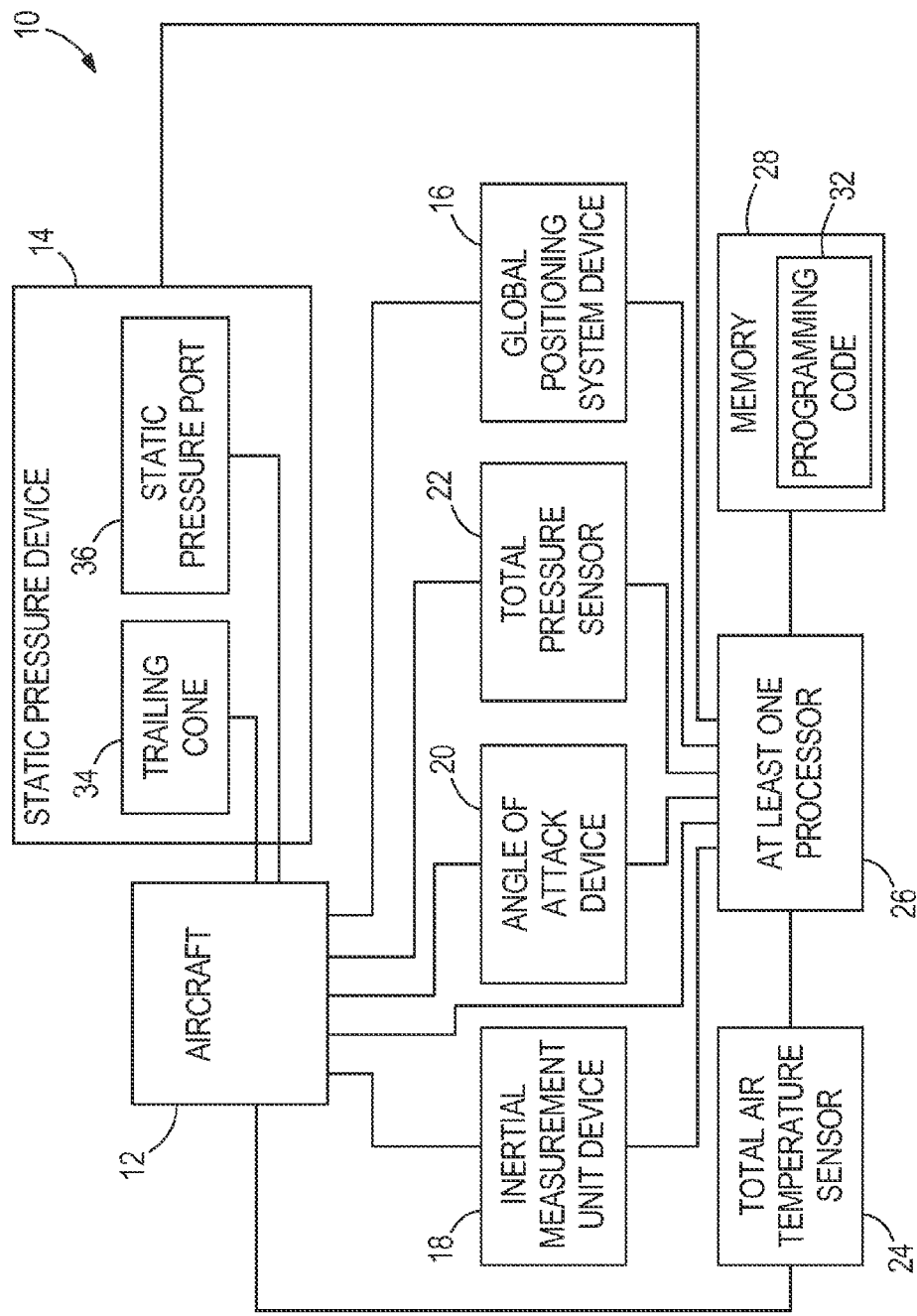
FIG. 1 illustrates a box diagram for one embodiment of a system that may be used to determine the airspeed of an aircraft.

FIG. 1 illustrates a box diagram for one embodiment of a system 10 that may be used to determine the airspeed of an aircraft 12. The system 10 includes a static pressure device 14, a global positioning system device 16, an inertial measurement unit device 18, an angle of attack device 20, a total pressure sensor 22, a total air temperature sensor 24, at least one processor 26, and a memory 28.

The static pressure device 14 is configured to determine a static pressure acting on the aircraft 12. The global positioning system device 16 is configured to determine an inertial position of the aircraft 12. The inertial measurement unit device 18 is configured to determine inertial measurements of the aircraft 12. The angle of attack device 20 is configured to determine an angle of attack of the aircraft 12. The total pressure sensor 22 is configured to determine a total pressure that the aircraft 12 experiences while the aircraft 12 is moving. The total air temperature sensor 24 is configured to determine a total air temperature that the aircraft 12 experiences while the aircraft 12 is moving. The at least one processor 26 is in electronic communication with the static pressure device 14, the global positioning system device 16, the inertial measurement unit device 18, the angle of attack device 20, the total pressure sensor 22, and the total air temperature sensor 24. The memory 28 is in electronic communication with the at least one processor 26. The memory 28 contains programming code 32 for execution by the at least one processor 26.

The programming code 32 is configured to determine the airspeed of the aircraft 12 using data obtained from each of the static pressure device 14, the global positioning system device 16, the inertial measurement unit device 18, the angle of attack device 20, the total pressure sensor 22, and the total air temperature sensor 24.

In one embodiment, the static pressure device 14 comprises a trailing cone 34 or a static pressure port 36. In other embodiments, the static pressure device 14 may vary. The programming code 32 may be configured to determine a pressure altitude time history and a static pressure time history for the aircraft 12 using the data obtained from the static pressure device 14. The programming code 32 may be configured to determine a geometric altitude time history and a flight path angle time history for the aircraft 12 using the data obtained from the inertial measurement unit device 18 and the global positioning system device 16. The programming code 32 may be configured to determine a pressure altitude at a virtual trapped static point and a geometric altitude at a virtual trapped static point for the aircraft 12 using the data obtained from each of the static pressure device 14, the global positioning system device 16, the inertial measurement unit device 18, and the angle of attack device 20.

The programming code 32 may be configured to determine a temperature deviation from a standard day and a temperature lapse rate deviation from a standard day using the data obtained from each of the static pressure device 14, the global positioning system device 16, the inertial measurement unit device 18, the total pressure sensor 22, and the total air temperature sensor 24. The programming code 32 may be configured to determine a calculated static pressure time history and a calculated pressure altitude time history for the aircraft 12 using the data obtained from each of the static pressure device 14, the global positioning system device 16, the inertial measurement unit device 18, the angle of attack device 20, the total pressure sensor 22, and the total air temperature sensor 24. In other embodiments, the programming code 32 may be configured to determine varying information. The airspeed of the aircraft 12 determined by the programming code 32 may comprise a calculated calibrated airspeed time history and a calculated Mach number time history for the aircraft 12. In other embodiments, the airspeed of the aircraft 12 determined by the programming code 32 may comprise varying information. In other embodiments, the system 10 of FIG. 1 may vary.

Figure 2:
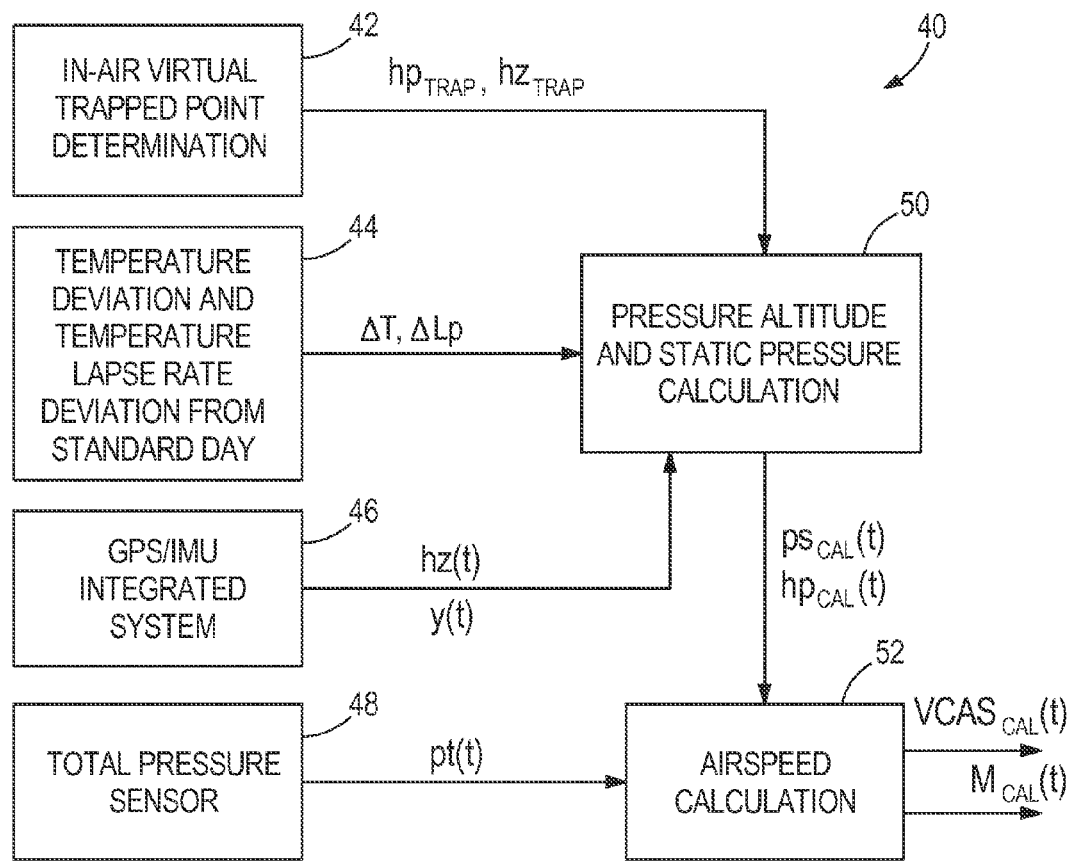
FIG. 2 illustrates a box diagram flowchart for one embodiment of a method for determining an airspeed of an aircraft.

FIG. 2 illustrates a box diagram flowchart 40 for one embodiment of a method for determining an airspeed of an aircraft. In box 42, an in-air virtual trapped static point determination determines the pressure altitude at a virtual trapped static point $hp_{TRAP}$ and the geometric altitude at a virtual trapped static point $hz_{TRAP}$ of the aircraft. As discussed later in this disclosure, the method shown in FIG. 3 may be used to make the determination of box 42. In box 44, a determination is made as to a temperature deviation from a standard day $\Delta T$ and a temperature lapse rate deviation from a standard day $\Delta L_p$ for the ambient outside the aircraft. As discussed later in this disclosure, the method shown in FIG. 6 may be used to make the determination of box 44. In box 46, a global positioning system device and an inertial measurement unit device may be used to determine a geometric altitude time history $hz(t)$ and a flight path angle time history $\gamma(t)$ for the aircraft. As discussed later in this disclosure, the method shown in FIG. 5 may be used to make the determination of box 46. In box 48, a total pressure sensor may be used to determine a total pressure time history $pt(t)$ that the aircraft experiences while moving. In box 50, the determinations of boxes 42, 44, and 46 may be used to determine a calculated static pressure time history $ps_{CAL}(t)$ and a calculated pressure altitude time history $hp_{CAL}(t)$ for the aircraft. In box 52, the determinations of boxes 48 and 50 may be used to determine an airspeed calculation for the aircraft comprising a calculated calibrated airspeed time history $VCAS_{CAL}(t)$ and a calculated Mach number time history $M_{CAL}(t)$ for the aircraft. In other embodiments, the method of FIG. 2 may be varied.

Figure 3:
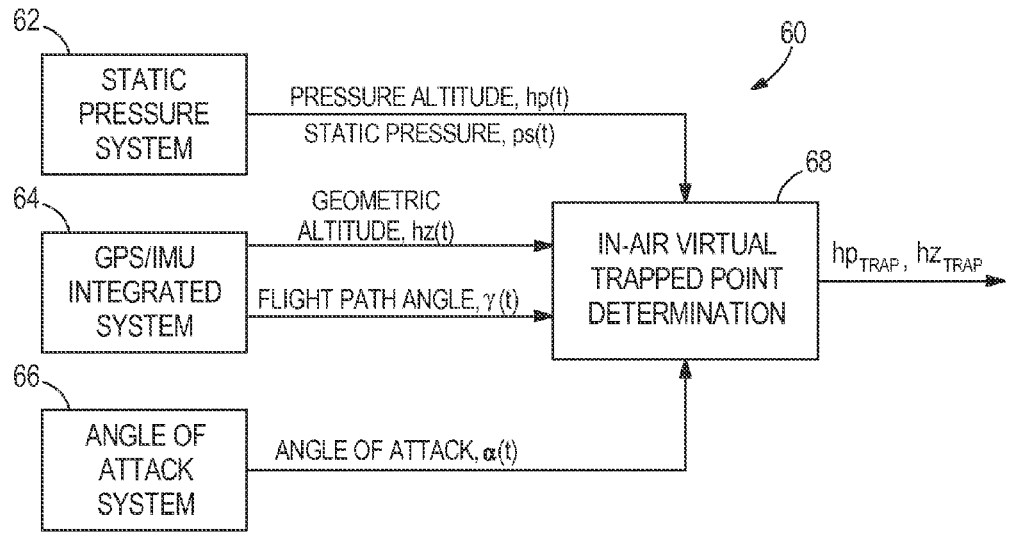
FIG. 3 illustrates a box diagram flowchart for one embodiment of a method for making an in-air virtual trapped static point determination for an aircraft.

FIG. 3 illustrates a box diagram flowchart 60 for one embodiment of a method for making the determination of box 42 of FIG. 2 comprising the in-air virtual trapped static point determination for the aircraft. In box 62, a determination is made using a static pressure system as to the pressure altitude time history $hp(t)$ and the static pressure time history $ps(t)$. As discussed later in this disclosure, the method shown in FIG. 4 may be used to make the determination of box 62. In box 64, a determination is made using a global positioning system device and an inertial measurement unit device as to a geometric altitude time history $hz(t)$ and a flight path angle time history $\gamma(t)$ for the aircraft. As discussed later in this disclosure, the method shown in FIG. 5 may be used to make the determination of box 64. In box 66, a determination is made using an angle of attack system as to an angle of attack time history $\alpha(t)$ for the aircraft. In box 68, the determinations of boxes 62, 64, and 66 may be used to determine the in-air virtual trapped static point determination comprising the pressure altitude at a virtual trapped static point $hp_{TRAP}$ and the geometric altitude at a virtual trapped static point $hz_{TRAP}$ for the aircraft. In other embodiments, the method of FIG. 3 may be varied.

Figure 4:
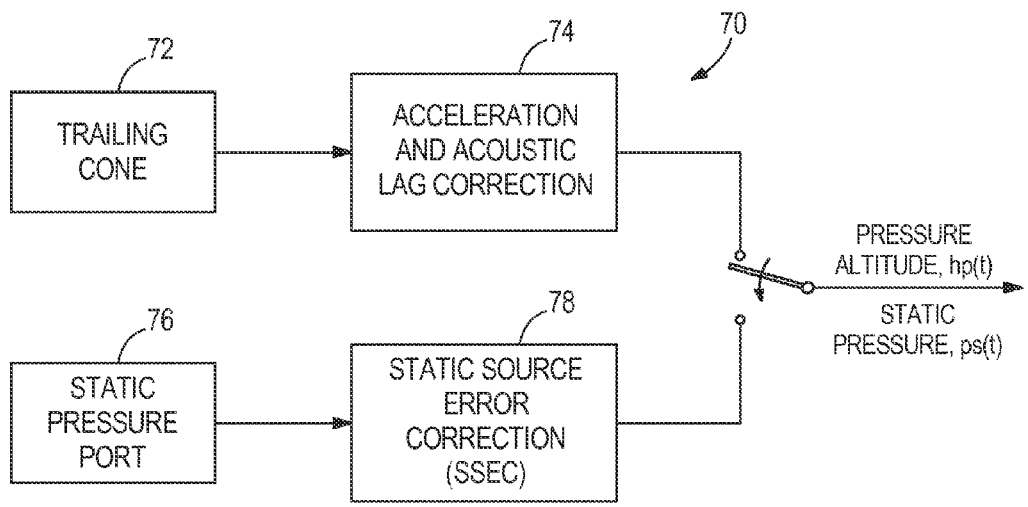
FIG. 4 illustrates a box diagram flowchart for one embodiment of a method for determining a pressure altitude time history hp(t) and a static pressure time history ps(t) for an aircraft.

FIG. 4 illustrates a box diagram flowchart 70 for one embodiment of a method for determining, using a static pressure system, the determination of box 62 of FIG. 3 comprising a pressure altitude time history $hp(t)$ and a static pressure time history $ps(t)$ for the aircraft. In box 72, a trailing cone is used to determine a raw static pressure for the aircraft. In box 74, an acceleration and acoustic lag correction is applied to the determined raw static pressure to determine the pressure altitude time history $hp(t)$ and the static pressure time history $ps(t)$ for the aircraft. Alternatively, instead of following the steps of boxes 72 and 74, the steps of boxes 76 and 78 may be followed to determine the pressure altitude time history $hp(t)$ and the static pressure time history $ps(t)$ for the aircraft. In box 76, a static pressure port is used to determine the raw static pressure for the aircraft. In box 78, a static source error correction is applied to the determined raw static pressure to determine the pressure altitude time history $hp(t)$ and the static pressure time history $ps(t)$ for the aircraft. In other embodiments, the method of FIG. 4 may be varied.

Figure 5:
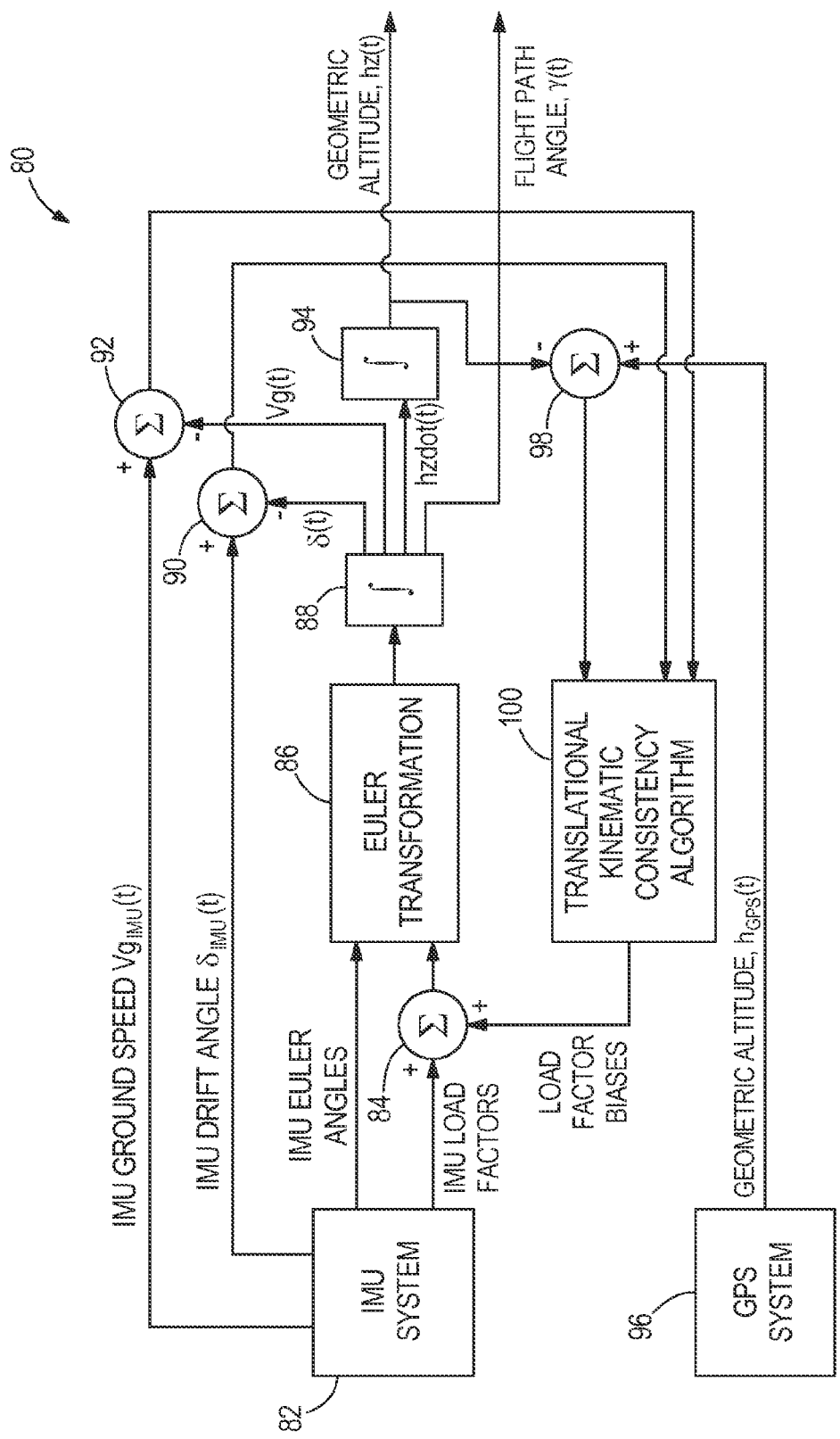
FIG. 5 illustrates a box diagram flowchart for one embodiment of a method for determining a geometric altitude time history hz(t) and a flight path angle time history γ(t) for an aircraft.

FIG. 5 illustrates a box diagram flowchart 80 for one embodiment of a method for determining, using a global positioning system device and an inertial measurement unit device, the determination of box 46 of FIG. 2 and the determination of box 64 of FIG. 3 comprising a geometric altitude time history $hz(t)$ and a flight path angle time history $\gamma(t)$ for the aircraft. In box 82, an inertial measurement unit device is used to determine an inertial measurement unit ground speed time history $Vg_{IMU}(t)$, an inertial measurement unit drift angle time history $\delta(t)$, inertial measurement unit Euler angles, and inertial measurement unit load factors for the aircraft. In box 84, a summation is made summing the inertial measurement load factors determined by box 82 and load factor biases determined by a translational kinematic consistency algorithm of box 100 to determine corrected load factors. In box 86, an Euler transformation is applied to the corrected load factors determined by box 84 using the inertial measurement unit Euler angles determined by box 82 to determine an aircraft north acceleration, an aircraft east acceleration, and an aircraft vertical acceleration. In box 88, the determination of box 86 is integrated to determine a drift angle time history $\delta(t)$, a ground speed time history $V_g(t)$, an aircraft vertical speed time history hzdot(t), and a flight path angle time history $\gamma(t)$. In box 90, a summation is made summing the inertial measurement unit drift angle time history $\delta_{IMU}(t)$ determination of box 82, and the drift angle time history $\delta(t)$ determination of box 88 to determine a drift angle error. In box 92, a summation is made summing the inertial measurement ground speed time history $Vg_{IMU}(t)$ determination of box 82 and the ground speed time history $V_g(t)$ determination of box 88 to determine a ground speed error. In box 94, the aircraft vertical speed time history hzdot(t) is integrated to determine the geometric altitude time history hz(t). In box 96, a global positioning system unit device is used to determine a WGS84 geometric altitude time history $h_{GPS}(t)$. In box 98, a summation is made summing the WGS84 geometric altitude time history $h_{GPS}(t)$ determination of box 96 and the geometric altitude time history hz(t) determination of box 94 to determine a geometric altitude error. In box 100, a translational kinematic consistency algorithm is applied to the geometric altitude error determination of box 98, to the drift angle error determination of box 90, and to the ground speed error determination of box 92 to determine the load factor biases. In other embodiments, the method of FIG. 5 may be varied.

Figure 6:
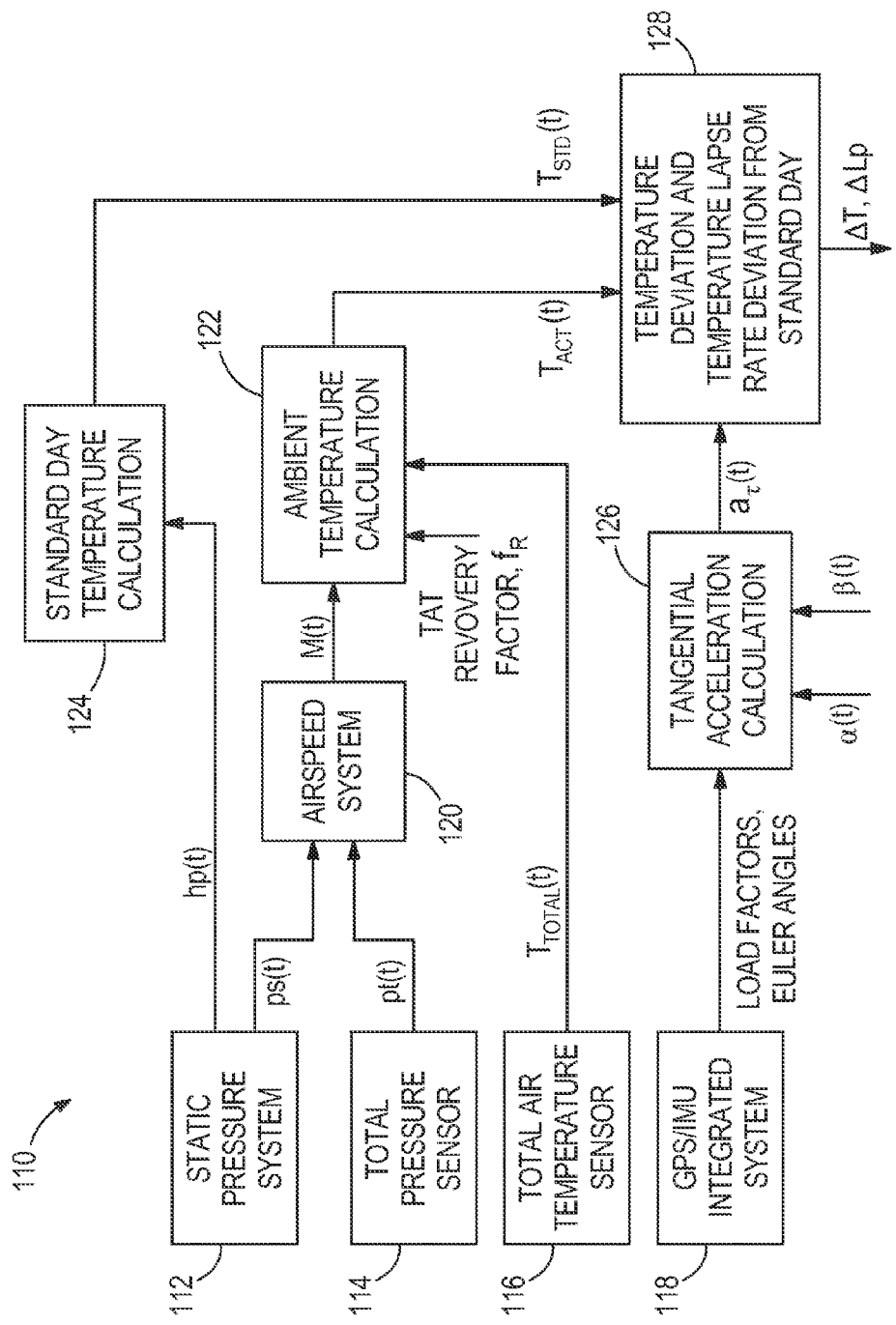
FIG. 6 illustrates a box diagram flowchart for one embodiment of a method for determining a temperature deviation from a standard day ΔT and a temperature lapse rate deviation from a standard day ΔLp.

FIG. 6 illustrates a box diagram flowchart 110 for one embodiment of a method for determining the determination of box 44 of FIG. 2 comprising a temperature deviation from a standard day $\Delta T$ and a temperature lapse rate deviation from a standard day $\Delta Lp$. In box 112, the static pressure system of FIG. 4 is used to determine a pressure altitude time history hp(t) and a static pressure time history ps(t). In box 114, a total pressure sensor is used to determine a total pressure time history pt(t). In box 116, a total air temperature sensor is used to determine a total air temperature time history $T_{TOTAL}(t)$. In box 118, the global positioning system device and the inertial measurement unit device of FIG. 5 is used to determine load factors and Euler angles. In box 120, an airspeed system is used to determine a Mach number time history M(t) based on the static pressure time history ps(t) determination of box 112 and on the total pressure time history pt(t) determination of box 114. In box 122, an actual ambient temperature calculation is made using the Mach number time history M(t) determination of box 120, a total air temperature TAT recovery factor $f_R$, and the total temperature time history $T_{TOTAL}(T)$ determination of box 116 to determine the actual temperature time history $T_{ACT}(T)$. In box 124, the pressure altitude time history hp(t) determination of box 112 is used to determine a standard day temperature calculation comprising a standard day temperature time history $T_{STD}(t)$. In box 126, the load factors and Euler angles determined by box 118 are used along with an angle of attack time history $\alpha(t)$ and a side-slip angle time history $\beta(t)$ to determine a tangential acceleration calculation comprising a tangential acceleration time history $a_\tau(t)$. In box 128, the actual temperature time history $T_{ACT}(t)$ determination of box 122, the standard day temperature time history $T_{STD}(t)$ determination of box 124, and the tangential acceleration time history $a_\tau(t)$ determination of box 126 are used to determine the temperature deviation from a standard day $\Delta T$ and the temperature lapse rate deviation from a standard day $\Delta Lp$. In other embodiments, the method of FIG. 6 may be varied.

Figure 7:
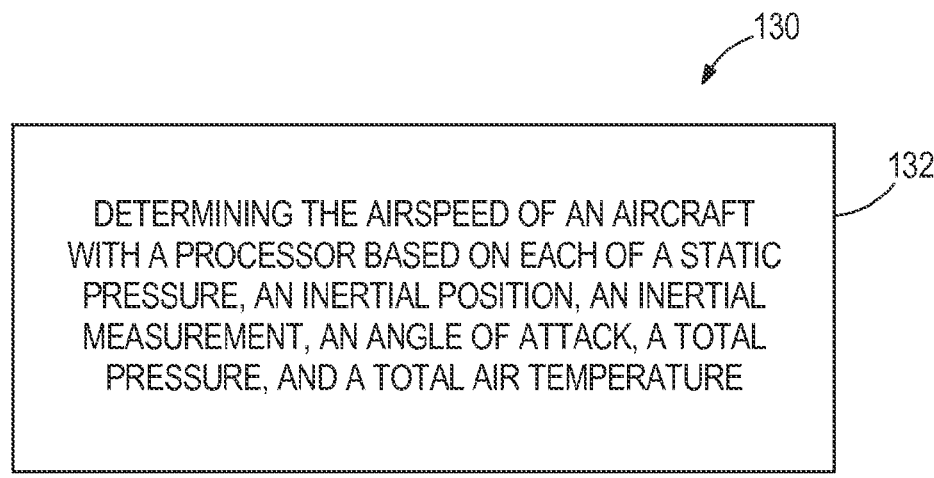
FIG. 7 is a flowchart illustrating one embodiment of a method for determining an airspeed of an aircraft.

FIG. 7 is a flowchart 130 illustrating one embodiment of a method for determining an airspeed of an aircraft. The systems and methods of FIGS. 1-6 may be used to implement the method of FIG. 7. In step 132, the airspeed of an aircraft may be determined with a processor based on each of a static pressure acting on the aircraft, an inertial position of the aircraft, an inertial measurement of the aircraft, an angle of attack of the aircraft, a total pressure that the aircraft experiences while the aircraft is moving, and a total air temperature that the aircraft experiences while the aircraft is moving. In one embodiment, step 132 may comprise determining a calculated calibrated airspeed time history and a calculated Mach number time history for the aircraft. In another embodiment, step 132 may further comprise making a determination as to the static pressure acting on the aircraft using a trailing cone or a static pressure port. In other embodiments, the determination as to the static pressure acting on the aircraft may be made using varying components.

In another embodiment, step 132 may further comprise making a determination as to a pressure altitude time history and as to a static pressure time history for the aircraft based on the static pressure acting on the aircraft. In yet another embodiment, step 132 may further comprise making a determination as to the geometric altitude time history and as to a flight path angle time history for the aircraft based on the inertial measurement and on the inertial position of the aircraft. In an additional embodiment, step 132 may further comprise making a determination as to a pressure altitude at a virtual trapped static point and as to a geometric altitude at a virtual trapped static point for the aircraft based on the static pressure, the inertial position, the inertial measurement, and the angle of attack of the aircraft.

In another embodiment, step 132 may further comprise making a determination as to a temperature deviation from a standard day and as to a temperature lapse rate deviation from a standard day based on each of the static pressure, the total pressure, the total air temperature, the inertial position, and the inertial measurement of the aircraft. In yet another embodiment, step 132 may comprise making a determination as to a calculated static pressure time history and as to a calculated pressure altitude time history for the aircraft based on each of the static pressure, the inertial position, the inertial measurement, the angle of attack, the total pressure, and the total air temperature. In other embodiments, any of the steps of the method of FIG. 7 may not be followed, may be altered in substance or in order, or one or more additional steps may be followed in varying orders.

Figure 8:
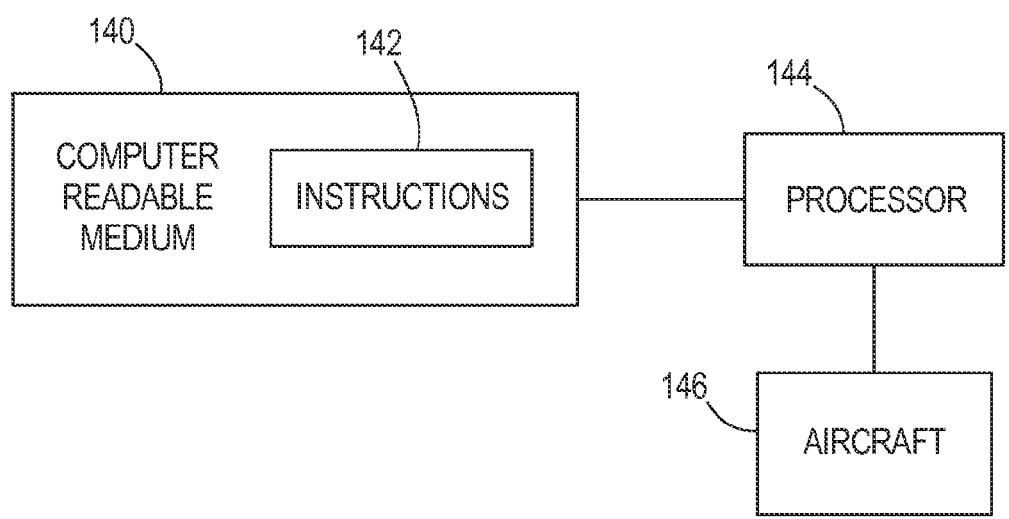
FIG. 8 illustrates a box diagram for one embodiment of a non-transitory computer readable medium which includes instructions to command a processor to determine an airspeed of an aircraft.

FIG. 8 illustrates a box diagram for one embodiment of a non-transitory computer readable medium 140 which includes instructions 142 to command a processor 144 to determine an airspeed of an aircraft 146. In one embodiment, the instructions 142 may be configured to determine a calculated calibrated airspeed time history and a calculated Mach number time history for the aircraft 146. The instructions 142 may be configured to command the processor 144 to determine the airspeed of the aircraft 146 based on each of a static pressure acting on the aircraft 146, an inertial position of the aircraft 146, an inertial measurement of the aircraft 146, an angle of attack of the aircraft 146, a total pressure that the aircraft 146 experiences while the aircraft 146 is moving, and a total air temperature that the aircraft 146 experiences while the aircraft 146 is moving. In one embodiment, the instructions 142 may further command the processor 144 to determine the static pressure acting on the aircraft 146 based on data from a trailing cone or a static pressure port. In another embodiment, the instructions 142 may further command the processor 144 to determine a pressure altitude time history and a static pressure time history for the aircraft 146 based on the raw static pressure measurements of the aircraft 146.

In still another embodiment, the instructions 142 may further command the processor 144 to determine a geometric altitude time history and a flight path angle time history for the aircraft 146 based on the inertial measurement and the inertial position of the aircraft 146. In another embodiment, the instructions 142 may further command the processor 144 to determine a pressure altitude at a virtual trapped static point and a geometric altitude at a virtual trapped static point for the aircraft 146 based on the static pressure, the inertial position, the inertial measurement, and the angle of attack of the aircraft 146.

In yet another embodiment, the instructions 142 may further command the processor 144 to determine a temperature deviation from a standard day and a temperature lapse rate deviation from a standard day based on each of the static pressure, the total pressure, the total air temperature, the inertial position, and the inertial measurement of the aircraft 146. In an additional embodiment, the instructions 142 may further command the processor 144 to determine a calculated static pressure time history and a calculated pressure altitude time history for the aircraft based on each of the static pressure, the inertial position, the inertial measurement, the angle of attack, the total pressure, and the total air temperature. In other embodiments, the instructions 142 may be configured to command the processor 144 to take varying actions to determine varying information.

One or more embodiments of the disclosure may reduce one or more issues associated with the current systems or methods for determining the airspeed of an aircraft. For instance, the use of trailing cones can be eliminated if desired which may reduce cost, and may increase reliability and accuracy. In other embodiments of the disclosure, one or more additional issues of one or more of the current systems or methods may be reduced or eliminated.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true scope of the subject matter described herein. Furthermore, it is to be understood that the disclosure is defined by the appended claims. Accordingly, the disclosure is not to be restricted except in light of the appended claims and their equivalents.

The invention claimed is:

1. An airspeed calculation system for determining the airspeed of an aircraft, comprising:
   a static pressure device configured to determine a static pressure acting on the aircraft;
   a global positioning system device configured to determine an inertial position of the aircraft;
   an inertial measurement unit device configured to determine inertial measurements of the aircraft;
   an angle of attack device configured to determine an angle of attack of the aircraft;
   a total pressure sensor configured to determine a total pressure that the aircraft experiences while the aircraft is moving;
   a total air temperature sensor configured to determine a total air temperature that the aircraft experiences while the aircraft is moving;
   at least one processor in electronic communication with the static pressure device, the global positioning system device, the inertial measurement unit device, the angle of attack device, the total pressure sensor, and the total air temperature sensor; and
   a memory in electronic communication with the at least one processor, wherein the memory comprises programming code for execution by the at least one processor, and the programming code is configured to:
      determine a pressure altitude at a virtual trapped static point and a geometric altitude at a virtual trapped static point for the aircraft using the data obtained from each of the static pressure device, the global positioning system device, the inertial measurement unit device, and the angle of attack device; and
      determine an airspeed of the aircraft using the determined pressure altitude at the virtual trapped static point, the determined geometric pressure altitude at the virtual trapped static point, and data obtained from each of the static pressure device, the global positioning system device, the inertial measurement unit device, the angle of attack device, the total pressure sensor, and the total air temperature sensor.

2. The airspeed calculation system of claim 1 wherein the static pressure device comprises a trailing cone or a static pressure port.

3. The airspeed calculation system of claim 1 wherein the programming code is configured to determine a pressure altitude time history and a static pressure time history for the aircraft using the data obtained from the static pressure device.

4. The airspeed calculation system of claim 1 wherein the programming code is configured to determine a geometric altitude time history and a flight path angle time history for the aircraft using the data obtained from the inertial measurement unit device and the global positioning system device.

5. The airspeed calculation system of claim 1 wherein the programming code is configured to determine a temperature deviation from a standard day and a temperature lapse rate deviation from a standard day using the data obtained from each of the static pressure device, the total pressure sensor, the total air temperature sensor, the global positioning system device, and the inertial measurement unit device.

6. The airspeed calculation system of claim 1 wherein the programming code is configured to determine a calculated static pressure time history and a calculated pressure altitude time history for the aircraft using the data obtained from each of the static pressure device, the global positioning system device, the inertial measurement unit device, the angle of attack device, the total pressure sensor, and the total air temperature sensor.

7. The airspeed calculation system of claim 1 wherein the airspeed of the aircraft determined by the programming code comprises a calculated calibrated airspeed time history and a calculated Mach number time history for the aircraft.

8. A method for determining an airspeed of an aircraft, comprising:
    determining a pressure altitude at a virtual trapped static point and a geometric altitude at a virtual trapped static point for the aircraft based on the static pressure, the inertial position, the inertial measurement, and the angle of attack of the aircraft; and
    determining with a processor the airspeed of the aircraft based on the determined pressure altitude at the virtual trapped static point, the determined geometric pressure altitude at the virtual trapped static point, and each of a static pressure acting on the aircraft, an inertial position of the aircraft, an inertial measurement of the aircraft, an angle of attack of the aircraft, a total pressure that the aircraft experiences while the aircraft is moving, and a total air temperature that the aircraft experiences while the aircraft is moving.

9. The method of claim 8 further comprising determining the static pressure acting on the aircraft using a trailing cone or a static pressure port.

10. The method of claim 8 further comprising determining a pressure altitude time history and a static pressure time history for the aircraft based on raw static pressure measurements of the aircraft.

11. The method of claim 8 further comprising determining a geometric altitude time history and a flight path angle time history for the aircraft based on the inertial measurement and the inertial position of the aircraft.

12. The method of claim 8 further comprising determining a temperature deviation from a standard day and a temperature lapse rate deviation from a standard day based on each of the static pressure, the total pressure, the total air temperature, the inertial position, and the inertial measurement of the aircraft.

13. The method of claim 8 further comprising determining a calculated static pressure time history and a calculated pressure altitude time history for the aircraft based on each of the static pressure, the inertial position, the inertial measurement, the angle of attack, the total pressure, and the total air temperature.

14. The method of claim 8 wherein the determining with the processor the airspeed of the aircraft comprises determining a calculated calibrated airspeed time history and a calculated Mach number time history for the aircraft.

15. A non-transitory computer readable medium including instructions to command a processor to:
    determine a pressure altitude at a virtual trapped static point and a geometric altitude at a virtual trapped static point for the aircraft based on the static pressure, the inertial position, the inertial measurement, and the angle of attack of the aircraft; and
    determine an airspeed of an aircraft based on the determined pressure altitude at the virtual trapped static point, the determined geometric pressure altitude at the virtual trapped static point, and each of a static pressure acting on the aircraft, an inertial position of the aircraft, an inertial measurement of the aircraft, an angle of attack of the aircraft, a total pressure that the aircraft experiences while the aircraft is moving, and a total air temperature that the aircraft experiences while the aircraft is moving.

16. The non-transitory computer readable medium of claim 15 wherein the instructions further command the processor to determine the static pressure acting on the aircraft based on data from a trailing cone or a static pressure port.

17. The non-transitory computer readable medium of claim 15 wherein the instructions further command the processor to determine a pressure altitude time history and a static pressure time history for the aircraft based on raw static pressure measurements of the aircraft.

18. The non-transitory computer readable medium of claim 15 wherein the instructions further command the processor to determine a geometric altitude time history and a flight path angle time history for the aircraft based on the inertial measurement and the inertial position of the aircraft.

19. The non-transitory computer readable medium of claim 15 wherein the instructions further command the processor to determine a temperature deviation from a standard day and a temperature lapse rate deviation from a standard day based on each of the static pressure, the total pressure, the total air temperature, the inertial position, and the inertial measurement of the aircraft.

20. The non-transitory computer readable medium of claim 15 wherein the instructions further command the processor to determine a calculated static pressure time history and a calculated pressure altitude time history for the aircraft based on each of the static pressure, the inertial position, the inertial measurement, the angle of attack, the total pressure, and the total air temperature.

21. The non-transitory computer readable medium of claim 15 wherein the instructions further command the processor to determine a calculated calibrated airspeed time history and a calculated Mach number time history for the aircraft.

* * * * *